(12) United States Patent
Shah et al.

(10) Patent No.: US 8,732,706 B2
(45) Date of Patent: May 20, 2014

(54) GENERATING GOVERNING METRICS FOR RESOURCE PROVISIONING

(75) Inventors: Amip Shah, Santa Clara, CA (US);
Ratnesh Sharma, Fremont, CA (US);
Cullen Bash, Los Gatos, CA (US);
Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1260 days.

(21) Appl. No.: 12/254,648

(22) Filed: Oct. 20, 2008

(65) Prior Publication Data

US 2009/0138888 A1 May 28, 2009

Related U.S. Application Data

(60) Provisional application No. 60/990,426, filed on Nov. 27, 2007.

(51) Int. Cl.
*G06F 9/50* (2006.01)

(52) U.S. Cl.
USPC .......................................... 718/100; 718/102

(58) Field of Classification Search
USPC ................................................. 718/100, 102
See application file for complete search history.

(56) References Cited

U.S. PATENT DOCUMENTS

| | | | | |
|---|---|---|---|---|
| 5,490,097 A * | 2/1996 | Swenson et al. | ................... | 703/2 |
| 6,065,011 A * | 5/2000 | Bulusu et al. | ........................ | 1/1 |
| 6,756,907 B2 * | 6/2004 | Hollaway | ...................... | 340/635 |
| 7,508,535 B2 * | 3/2009 | Hart et al. | ..................... | 358/1.15 |
| 7,536,689 B2 * | 5/2009 | Mangan | ........................ | 718/100 |
| 8,266,592 B2 * | 9/2012 | Beto et al. | ...................... | 717/124 |
| 2002/0073129 A1 * | 6/2002 | Wang et al. | ................... | 709/102 |
| 2005/0137926 A1 * | 6/2005 | Zhang et al. | ...................... | 705/9 |
| 2008/0195843 A1 * | 8/2008 | Muniandy | ........................ | 712/31 |
| 2008/0244610 A1 * | 10/2008 | Zhang et al. | .................... | 718/104 |

OTHER PUBLICATIONS

"Computer Dictionary: The Comprehensive Standard for Business, School, Library, and Home", ©1994, Microsoft Press®, Second Edition, p. 236, term "library".*
Free On-Line Dictionary of Computing (FOLDOC), www.foldoc.org search term: library ©1998.*

* cited by examiner

*Primary Examiner* — Aimee Li

(57) ABSTRACT

In a method of generating governing metrics, a high-level goal to be met in a provisioned system is identified. In addition, a low-level governing policy designed to facilitate achievement of the high-level goal is selected and properties relating to the selected low-level governing policy are identified. The identified properties are formulated to define governing metrics relevant to the selected low-level governing policy and the formulated governing metrics are outputted. The formulated governing metrics are configured to be used in at least one of evaluating and controlling resource provisioning in the provisioned system.

20 Claims, 6 Drawing Sheets

GENERATING GOVERNING METRICS FOR RESOURCE PROVISIONING

CROSS-REFERENCE TO RELATED APPLICATION

The present application claims priority from the provisional application Ser. No. 60/990,426, filed Nov. 27, 2007, the contents of which are incorporated herein by reference in their entirety.

The present application is related to U.S. Pat. No. 7,596, 431, titled "METHOD FOR ASSESSING ELECTRONIC DEVICES," to George Forman et al., and hereby incorporated by reference in its entirety.

BACKGROUND

Electronic systems are typically implemented to achieve or maintain high-level goals. The high-level goals include, for instance, meeting the requirements set forth in a service level agreement (SLA), such as, minimum available bandwidth, minimum uptimes, and maximum energy consumption goals. In addition to achieving or maintaining the high-level goals, optimization schemes have been proposed to substantially minimize the energy consumed by the electronic systems.

Various metrics have been proposed for achieving and maintaining the high-level goals, as well as, for substantially minimizing the amount of energy consumed by the electronic systems. These metrics are normally defined exclusively for a specific purpose and therefore, if the high-level goal changes, the utility of the metric with respect to the high-level goal decreases. In addition, the metrics are normally defined a priori, and thus often fail to appropriately change with changing goals. Thus, although conventionally formulated metrics are typically capable of achieving and maintaining the high-level goals when the electronic systems are initially operated, these metrics are unable to maintain the high-level goals, or optimization goals, as conditions change with respect to the electronic systems.

It would thus be beneficial to be able to achieve the high-level goals in a substantially optimized manner without suffering from all of the drawbacks and disadvantages associated with conventionally formulated metrics.

BRIEF DESCRIPTION OF THE DRAWINGS

Features of the present invention will become apparent to those skilled in the art from the following description with reference to the figures, in which.

DETAILED DESCRIPTION

Figure 1:
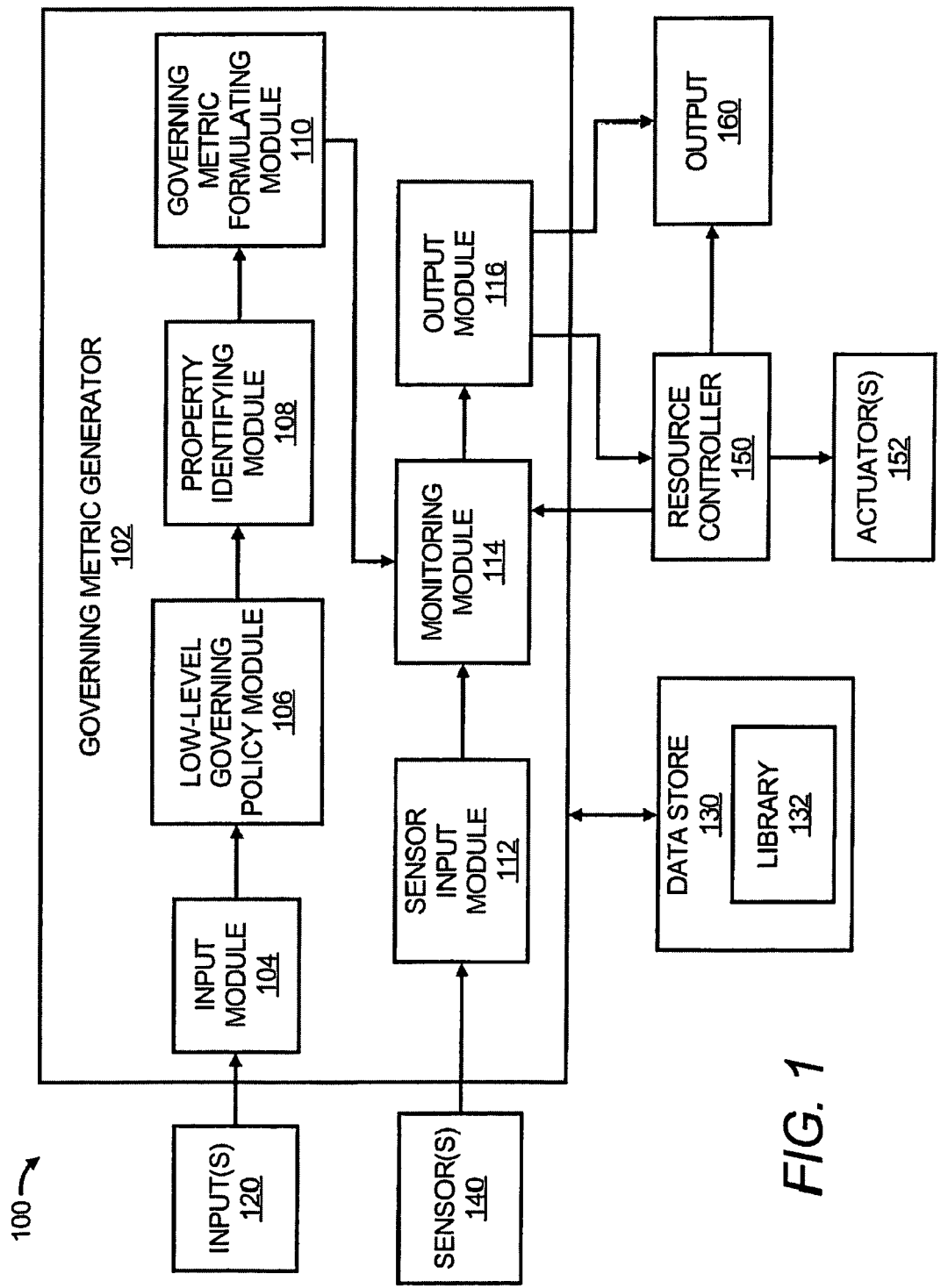
FIG. 1 shows a simplified block diagram of a system for generating governing metrics for use in at least one of evaluating and controlling resource provisioning in a provisioned system, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are systems and methods of generating governing metrics for use in at least one of evaluating and controlling resource provisioning in a provisioned system. The systems and methods disclosed herein generally enable governing metrics to be dynamically generated as high-level goals of the provisioned system vary temporally. In addition, or alternatively, the systems and methods disclosed herein generally enable different governing metrics to be generated for different zones of the provisioned system. In one regard, therefore, the systems and methods disclosed herein enable resources in the provisioned system to be dynamically provisioned, which therefore enables the resources to be provisioned with a substantially optimized level of effectiveness in reaching and/or maintaining a desired high-level goal.

In other words, the systems and methods disclosed herein generally enable the appropriate governing metric to be generated, even as the desired high-level goal changes over time or differs between different locations of the provisioned system. The generated governing metric may also be evaluated to determine whether the generated governing metric is appropriate for the desired high-level goal. In addition, other governing metrics may also be evaluated to determine whether they have a greater level of effectiveness with respect to the desired high-level policy. As such, the governing metric for use in provisioning resources may substantially be optimized for the desired high-level goal.

Through implementation of the systems and methods disclosed herein, governing metrics may be developed for providing information about the physical state of a provisioned system, evaluating the appropriateness of resources provisioned to the provisioned system at any given time, controlling changes to the provisioning of resources to the provisioned system, either statically or dynamically, allocating resources within or external to the system, either statically or dynamically, managing to a resources within an independent or integrated compute, power, and/or cooling system and infrastructure, and continuously updating the developed governing metrics to substantially ensure that the provisioned system utilizes the governing metrics that have historically been the most successful at meeting the desired high-level goal. In addition, the systems and methods disclosed herein are able to generate governing metrics that are configured to be utilized in appropriately provisioning resources to unite power, cooling, and compute infrastructures to dynamically meet one or more high-level goals.

With reference first to FIG. 1, there is shown a simplified block diagram of a system 100 for generating governing metrics for use in at least one of evaluating and controlling resource provisioning in a provisioned system, according to an example. It should be understood that the system 100 may include additional elements and that some of the elements described herein may be removed and/or modified without departing from a scope of the system 100.

As shown, the system 100 includes a governing metric generator 102, which may comprise software, firmware, or hardware configured to generate governing metrics for use in at least one of identifying and controlling resource provisioning in a provisioned system. The governing metric generator 102 is depicted as including an input module 104, a low-level governing policy module 106, a property identifying module 108, a governing metric formulating module 110, a sensor input module 112, a monitoring module 114, and an output module 116.

In instances where the governing metric generator 102 comprises software, the governing metric generator 102 may be stored on a computer readable storage medium and may be executed by the processor of a computing device (not shown). In these instances, the modules 104-116 may comprise software modules or other programs or algorithms configured to perform the functions described herein below. In instances where the governing metric generator 102 comprises firmware or hardware, the governing metric generator 102 may comprise a circuit or other apparatus configured to perform the functions described herein. In these instances, the modules 104-116 may comprise one or more of software modules and hardware modules.

In any regard, the governing metric generator 102 may be executed or implemented to generate a governing metric for use in at least one of evaluating and controlling resource provisioning in a provisioned system. The provisioned system may include an apparatus, such as, a desk top computer, a laptop computer, a server, a personal digital assistant, a printer, air conditioning unit components, etc., or a combination of multiple systems, such as, servers on an electronics cabinet, an IT data center, a print factory, an air conditioning system, etc. The provisioned systems may also include parts of combinations of multiple systems, such as, automobiles, aircrafts, ships, buildings, etc.

As shown in FIG. 1, the input module 104 is configured to receive one or more inputs 120. The inputs 120 may be received from a computing device, through which data may be inputted into the governing metric generator 102. The governing metric generator 102 and the computing device through which the inputs 120 are received may form part of the same computing device or different computing devices. The inputted data may include, for instance, one or more high-level goals that the provisioned system is requested to achieve. Generally speaking, the one or more high-level goals may comprise any manageable goal that may be translated into lower level governing policies. In addition, the one or more high-level goals may be inputted into the input module 104 as a service level agreement (SLA) between the provisioned system operator and a client.

By way of example, the high-level goals may include goals designed to maximize system reliability, minimize energy consumption, maximize system performance, environmental sustainability, etc., of the provisioned system. The one or more high-level goals may also be a combination or reinterpretation of the one or more high-level goals. For instance, the high-level goals may include goals designed to operate a provisioned system at the highest temperature possible, to achieve maximum energy savings, etc.

In any regard, the governing metric generator 102 may store the inputs 120 in a data store 130, which may comprise volatile and/or non-volatile memory, such as DRAM, EEPROM, MRAM, flash memory, and the like. In addition, or alternatively, the data store 130 may comprise a device configured to read from and write to a removable media, such as, a floppy disk, a CD-ROM, a DVD-ROM, or other optical or magnetic media. Although the data store 130 is depicted as comprising a component separate from the governing metric generator 102, the data store 130 may be integrated with the governing metric generator 102 without departing from a scope of the governing metric generator 102.

The input module 104 may also provide a graphical user interface through which a user may control the governing metric generator 102. For instance, a user may use the graphical user interface to activate the governing metric generator 102, to input additional information into the governing metric generator 102, such as, one or more low-level governing policies, etc.

The low-level governing policy module 106 is configured to select a low-level governing policy designed to facilitate achievement of one or more identified high-level goals. The low-level governing policy generally comprises a policy for achieving local control of one or more resources and depends upon the one or more high-level goals that the provisioned system is configured to achieve. In addition, the low-level governing policies may be correlated with respective ones of the high-level goals such that the low-level governing policies corresponding to a selected high-level policy may relatively easily be selected. As such, the low-governing policies may thus vary as the identified high-level goals vary.

The correlations between the high-level goals and the low-level governing policies may be stored in a library 132 contained in the data store 130. As an example, the low-level governing policies may be ranked according to their effectiveness for each of the high-level goals. As discussed in greater detail herein below, the rankings of the low-level governing policies may be updated based upon detected effectiveness levels of the low-level governing policies.

In any regard, the low-level governing policy module 106 may access the library 132 to formulate the low-level governing policy designed to facilitate achievement of the one or more identified high-level goals. In addition, the property identifying module 108 is configured to identify properties of the provisioned system relevant to the low-level governing policies. The properties of the provisioned system may include, for instance, temperature, pressure, volume, mass flowrate, fluid density, specific heat, thermal conductivity, ink usage, etc.

According to an example, the library 132 may also include correlations between the properties, or key state variables, of the provisioned system and the low-level governing policies. Thus, for instance, the library 132 may include an indication that the property, "temperature," is relevant in the low-level governing policy, "maintaining the provisioned system within a predetermined temperature range." In this example, the property identifying module 108 may access the library 132 to identify the properties relating to the selected low-level governing policy.

The governing metric formulating module 110 is configured to formulate the properties identified by the property identifying module 108 to define governing metrics relevant to the selected low-level governing policy. The governing metrics generally comprise a formulation of the identified properties that are appropriate for the low-level governing policy. In other words, the governing metric formulating module 110 is configured to combine the identified properties into definitions that are appropriate to the selected low-level governing policy.

The formulated governing metrics may be sent to a monitoring module 114 configured to track, for instance, the effectiveness levels of the formulated governing metrics with respect to identified high-level goals and/or low-governing policies. The monitoring module 114 may also receive input from the sensor input module 112, which is configured to receive sensed data input from one or more sensors 140. The one or more sensors 140 may include, for instance, sensors configured to detect temperature, pressure, volume, mass flowrate, utilization, humidity, etc. In addition, the monitoring module 114 may store the sensed input resulting from application of the formulated governing metrics in the data store 130. Various manners in which the effectiveness levels of the formulated governing metrics may be tracked by the monitoring module 114, or in other manners, are described in greater detail herein below.

The output module 116 is configured to output the formulated governing metrics to either or both of an output 160 and a resource controller 150. The output 160 may comprise, for instance, a display configured to display the formulated governing metrics or other information, such as, information pertaining to whether an identified high-level goal is being met. In addition, or alternatively, the output 160 may comprise a fixed or removable storage device on which the information stored, such as, the data store 130. As a further alternative, the output 160 may comprise a connection to a network over which the information may be communicated.

The resource controller 150 may comprise software, firmware, or hardware configured to control the provisioning of resources in the provisioned system. The resources may include, for instance, airflow temperature, airflow volume flow rate, workload placement, server utilization, ink or toner usage, etc. In provisioning the resources, the resource controller 150 may manipulate one or more actuators 152, which may comprise, for instance, air conditioning units, servers, inkjet printheads, etc. In addition, the commands issued by the resource controller 150 may be outputted on the output 160 and/or to the monitoring module 114, such that, the commands issued may be monitored.

Examples of methods in which the system 100 may be employed to generate governing metrics for use in at least one of evaluating and controlling resource provisioning in a provisioned system will now be described with respect to the following flow diagrams of the methods 200, 300, 350, and 370 respectively depicted in FIGS. 2 and 3A-3C. It should be apparent to those of ordinary skill in the art that the methods 200, 300, 350, and 370 represent generalized illustrations and that other steps may be added or existing steps may be removed, modified or rearranged without departing from the scopes of the methods 200, 300, 350, and 370.

The descriptions of the methods 200, 300, 350, and 370 are made with reference to the system 100 illustrated in FIG. 1, and thus makes reference to the elements cited therein. It should, however, be understood that the methods 200, 300, 350, and 370 are not limited to the elements set forth in the system 100. Instead, it should be understood that the methods 200, 300, 350, and 370 may be practiced by a system having a different configuration than that set forth in the system 100.

Some or all of the operations set forth in the methods 200, 300, 350, and 370 may be contained as utilities, programs, or subprograms, in any desired computer accessible medium. In addition, the methods 200, 300, 350, and 370 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

A controller, such as a processor (not shown), may implement or execute the governing metric generator 102 to perform either or both of the methods 200, 300, 350, and 370 in generating governing metrics for use in at least one of evaluating and controlling resource provisioning in a provisioned system.

Figure 2:
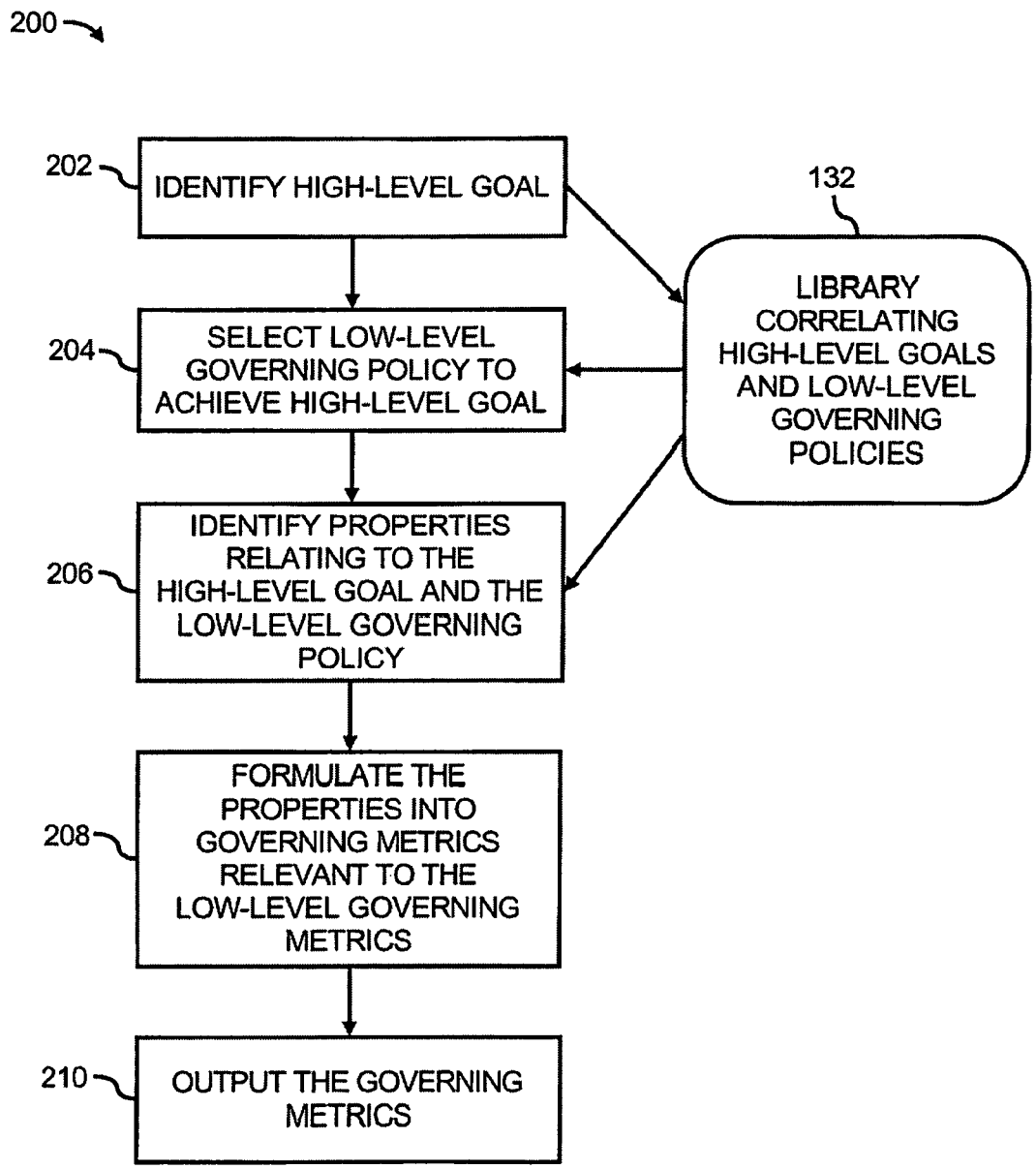
FIG. 2 illustrates a flow diagram of a method of generating governing metrics for use in at least one of evaluating and controlling resource provisioning in a provisioned system, according to an embodiment of the invention.

With reference first to FIG. 2, there is shown a flow diagram of a method 200 of generating governing metrics for use in at least one of evaluating and controlling resource provisioning in a provisioned system, according to an example. The method 200 may also be implemented or executed to substantially optimize resource provisioning to achieve one or more high-level goals.

At step 202, a high-level goal is identified either through user input or through an automated program. The high-level goal may comprise any manageable goal for the provisioned system that may be translated into lower level governing policies. The high-level goals may therefore be outlined in service level agreements (SLAs) between the provisioned system provider and one or more clients.

By way of example, the high-level goals may include one or more of goals related to substantially maximizing system reliability, substantially minimizing energy consumption, substantially maximizing system performance, substantially maximizing environmental sustainability, etc. These examples of high-level goals will be relied upon to describe examples of the other steps contained in the method 200.

At step 204, a low-level governing policy designed to facilitate achievement of the high-level goal is selected. The low-level governing policy comprises a policy for achieving local control of one or more resources and generally depends upon the identified high-level goal sought to be achieved. The correlation between the low-level governing policies and the high-level goals may be stored in the library 132 and the library 132 may be accessed in formulating the appropriate low-level governing policy at step 204. In addition, the correlation may be developed and updated as described herein below.

By way of particular example, if the high-level goal is to substantially maximize system reliability, it may be preferable to operate the systems farthest away from a damage boundary, that is, to maintain the systems below a predefined temperature. As such, the temperature of the system may be most critical, and therefore, monitoring one or more of the system temperature, the airflow rate in the system, fluid temperature, etc, may be relevant to substantially maximizing system reliability. In this example, the low-level governing policy may be selected to maintain the system temperature below a predetermined level.

As another example, if the high-level goal is to substantially minimize energy consumption, the total power consumption levels of the system and its supporting infrastructure may be most critical. Therefore, parameters relevant to ensemble power consumption, such as, heat dissipation, cooling load, etc., may be relevant to substantially minimizing energy consumption. In this example, the low-level governing policy may be selected to substantially minimize power consumption at one or more levels in the system.

As a further example, if the high-level goal is to substantially maximize system performance, adequate cooling for scaling of compute resources may be most critical. Therefore, parameters relevant to the cooling infrastructure, such as, load, fluid temperature, fluid flow rate, etc., as well as system temperature characteristics may be relevant to substantially maximizing system performance. In this example, the low-level governing policy may be selected to substantially maximize cooling capacity in the system.

As a yet further example, if the high level goal is to substantially maximize environmental sustainability, minimization of the destruction of available resources, or equivalently, minimization of the exergy destruction of the system may be most critical. Therefore, parameters relevant to the exergy of the system, such as, temperature, airflow rate, pressure, airflow volume, etc., may be relevant to substantially maximizing environmental sustainability. In this example, the low-level governing policy may be selected to substantially minimize exergy destruction in the system.

In any regard, at step 206, properties of the provisioned system relating to the low-level governing policy selected at step 204 are identified. The properties relating to the low-level governing policy may be stored in the library 132 and the library 132 may be accessed to identify the relevant properties. The properties may comprise, for instance, temperature, pressure, volume, mass flowrate, fluid density, specific heat, thermal conductivity, ink usage, etc. The properties may comprise the parameters discussed in the examples of low-level governing policies above.

By way of example, if the low-level governing policy is to maintain a particular flowrate, for instance, maintaining a fan speed, then those characteristics relevant to flow, such as, pressure, friction factors, etc., may be pre-loaded in the library 132 along with an equation regarding how these characteristics are correlated for the control of the flowrate. As another example, if the low-level governing policy is to maintain a particular temperature, for instance, by circulating a predetermined amount of cold fluid, then those characteristics relevant to thermal management, such as, thermal conductivity, specific heat, fluid density, mass flowrate, temperature, etc., may be pre-loaded in the library 132 along with the appropriate heat transfer equations.

At step 208, the properties are formulated to define governing metrics that are relevant to the formulated low-level governing metrics. The governing metrics generally comprise a formulation of the identified properties that are appropriate for the selected low-level governing policy. In other words, the identified properties may be combined into definitions that are appropriate to the selected low-level governing policy.

By way of example, if the high-level goal is to substantially maximize environmental sustainability, then the low-level governing policy may be to substantially minimize the exergy destruction of the system and the governing metric may comprise the exergy or the available energy of the system. In this example, the properties may comprise enthalpy (h) of the system, entropy (s), and temperature (T). In addition, the properties may be combined to formulate the properties into a governing metric, in this case, exergy ($\psi$), according to the following equation:

$$\omega = (h - h_0) - T_0(s - s_0) \quad \text{Equation (1)}$$

In Equation (1), the subscript '0' corresponds to a reference or ambient state against which the system is evaluated. Equation (1) may be defined per unit mass of the system at steady state with negligible kinetic and potential energy. If the total exergy of the system is to be calculated, Equation (1) may be multiplied by the mass, or equivalently, the density and volume, of the system. Conditions corresponding to unsteady state or other forms of energy may also be included as appropriate from basic thermodynamic theory. In addition, Equation (1) may be adjusted as desired based on both the governing metric and/or the properties regarding which information is available. For example, for air, as an ideal gas, with negligible changes in pressure and volume, Equation (1) may be approximately reduced in terms of temperature (T) and specific heat ($C_p$) as noted in the following equation:

$$\psi = C_p(T - T_0) - T_0 C_p \ln(T/T_0). \quad \text{Equation (2)}$$

According to another example, the low-level governing policy may be composed of lower-level governing policies depending on the high-level goal. By way of example, if the high-level goal is to substantially minimize energy consumption, the low-level governing policy may comprise a local workload placement index (LWPI), which quantifies the efficiency associated with placing workloads on various computing devices, for instance, in a data center. The LWPI of a computing device (i) may be calculated based upon one or more of a thermal management margin $(T_{set} - T_{in})_i$, a fluid moving device (j) margin $(T_{SAT} - T_{SAT,min})_j$, a thermal correlation index (TCI), and a recirculation level of the system $(T_{in} - T_{SAT})_j$, according to the following equation:

$$LWPI_i = \frac{(T_{set} - T_{in})_i + \left[(T_{SAT} - T_{SAT,min})_j \cdot TCI_j\right]_i}{(T_{in} - T_{SAT})_i}. \quad \text{Equation (3)}$$

In Equation (3), $T_{set}$ is the setpoint temperature of an air conditioning (AC) unit (j), $T_{in}$ is the inlet temperature of a computing device (i), $T_{SAT}$ is the supply air temperature of the AC unit, and $T_{SAT,min}$ is the minimum air temperature supplied by the AC unit (j).

The TCI is a function of the relative level of influence fluid moving devices, such as, air conditioning units, have over the sensors positioned at various locations in the data center. TCI and LWPI are discussed in greater detail in commonly assigned U.S. Pat. No. 7,596,431, issued on Sep. 29, 2009, entitled "METHOD FOR ASSESSING ELECTRONIC DEVICES", to George Forman et al., the disclosure of which is hereby incorporated by reference in its entirety.

As noted from the discussion above, the LWPI is composed of lower-level governing metrics that describe a thermal management margin, a fluid moving device margin, and a recirculation level. The lower-level governing metrics may be emphasized with different weighting factors depending on the low-level governing policy to form a modified low-level governing policy. In addition, or alternatively, one or more of the properties may be weighted differently from one or more of the other properties in formulating the governing metrics.

In any regard, the governing metrics formulated at step 208 may be outputted as indicated at step 210. The formulated governing metrics may be outputted to either or both of an output 160 and a resource controller 150. According to an example, the formulated governing metrics may be displayed to a user who may evaluate the effectiveness of the formulated governing metrics with respect to achieving the high-level goal. As another example, the resource controller 150 may control one or more actuators 152 based upon the formulated governing metrics.

By way of example, the resource controller 150 may control the actuators of one or more air conditioning units to vary the temperature of airflow supplied to one or more locations of the provisioned system if the governing metric includes temperature as one of its parameters. As another example, the resource controller 150 may control the actuators of one or more air conditioning units to vary the flow rate of air supplied and may not control the temperature of the airflow if the governing metric includes mass flow rate but does not include temperature.

The changes in resource provisioning in the provisioned system caused by manipulation of the one or more actuators 152 may be monitored and evaluated to determine the effectiveness levels of one or more of the low-level governing policy, the properties relating to the low-level governing policy, and the formulated governing metric with respect to reaching the high-level goal. In addition, the effectiveness levels may be stored in the library 132 and one or more of the low-level governing policy, the properties relating to the low-level governing policy, and formulated governing metric may be ranked with other metrics with respect to how effective they are at reaching one or more high-level goals. The ranking may be updated as the effectiveness levels of other low-level governing policies and their respective properties and formulated governing metrics are determined.

Figure 3A:
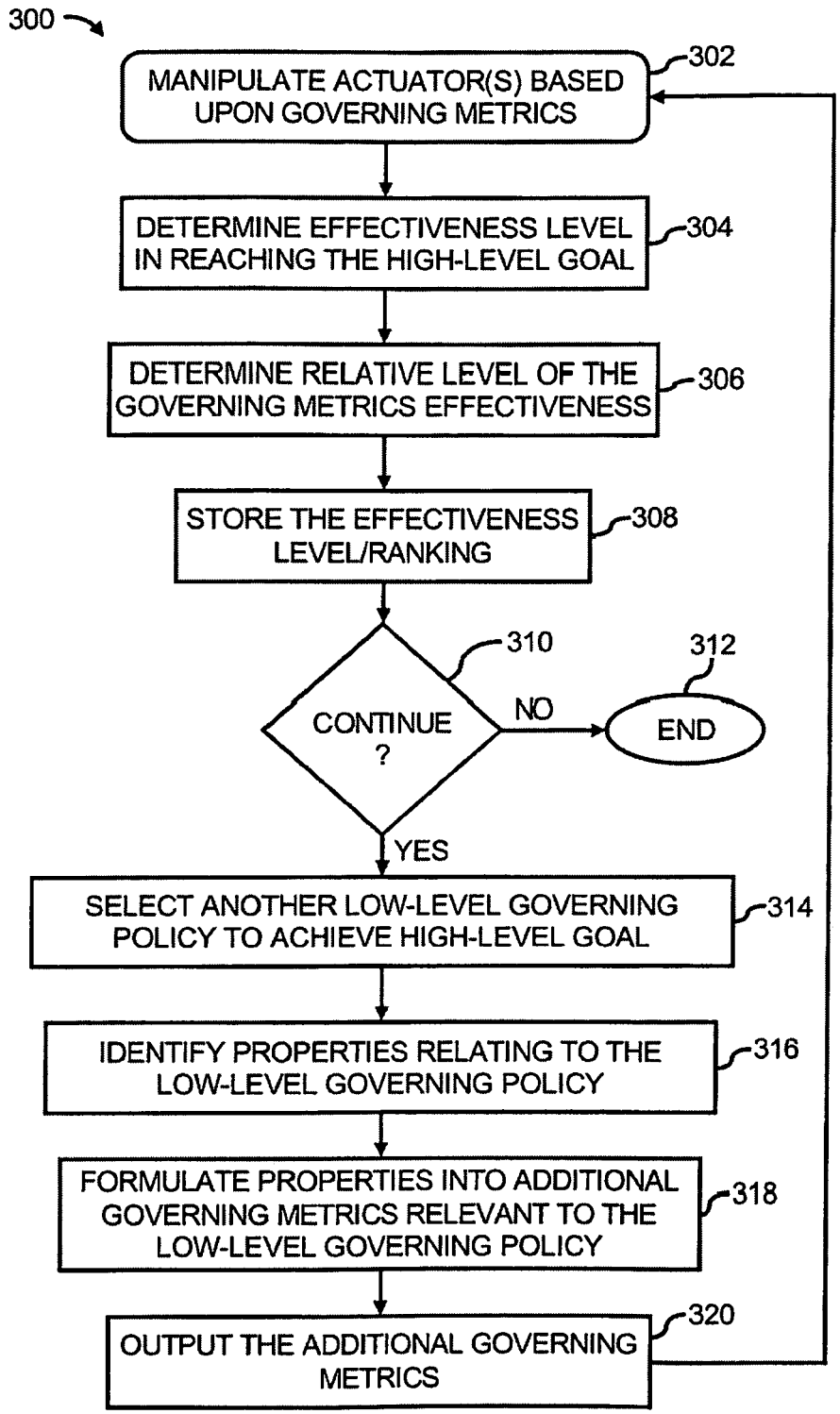
FIG. 3A illustrates a flow diagram of a method of monitoring and evaluating the effectiveness levels of governing metrics formulated through implementation of, for instance, the method depicted in FIG. 2, according to an embodiment of the invention.

With particular reference now to FIG. 3A, there is shown a method 300 of monitoring and evaluating the effectiveness levels of the governing metrics formulated through implementation of, for instance, the method 200 depicted in FIG. 2, according to an example. The method 300 may also be implemented to rank the low-level governing policies according to their effectiveness levels with respect to the high-level goals and to update the rankings as additional data is collected.

At step 302, the resource controller 150 manipulates the actuators 152 according to the governing metrics formulated at step 208. By way of example, the actuators 152 may comprise air conditioning units and the governing metrics may comprise supply heat index (SHI), which is a dimensionless measure of the amount of re-circulation of heated airflow into cooled airflow occurring at various locations in a room. A more detailed description of SHI is provided in commonly assigned U.S. Pat. No. 7,051,946, entitled "AIR RE-CIRCULATION INDEX", filed on May 29, 2003, which names Cullen E. Bash et al. as inventors, and the disclosure of which is hereby incorporated by reference in its entirety. In this example, the high-level goal may be to substantially maximize system reliability, the low-level governing policy may be to maintain the system temperature below a predetermined level, and the properties of the low-level governing policy may include temperature measured at multiple locations in the room.

At step 304, the effectiveness level of the formulated governing metrics in reaching and/or maintaining the high-level goal is determined. The effectiveness level of the formulated governing metrics may be determined based upon whether manipulation of the one or more actuators 152 according to the formulated governing metrics resulted in the high-level goal being reached and/or maintained. The effectiveness level may be determined through analysis of the data obtained by the sensors 140.

In addition, the relative level to which the formulated governing metrics resulted in reaching and/or maintaining of the high-level goal may be determined, as indicated at step 306. For instance, the formulated governing metrics may be rated according to a percentage of the high-level goal that was reached, rated according to a graduated scale of performance, etc. The relative level of the formulated governing metrics may also be compared and ranked with respect to the relative levels of other formulated governing metrics. The relative level of the formulated governing metrics and/or its ranking with respect to other formulated governing metrics in reaching and/or maintaining a particular high-level goal is stored in the library 132, as indicated at step 308.

At step 310, a determination is made as to whether the method 300 is to continue. The method 300 may end, as indicated at step 312 in response to a variety of conditions, such as, a user-initiated command to end, following a predetermined amount of time, following a predetermined number of iterations, in response to a determination that an optimal governing metric has been formulated, etc. As such, according to an example, the method 300 may be continued for an indefinite period of time to substantially continuously gather data and to improve formulation of governing metrics having greater levels of effectiveness in reaching and/or maintaining a high-level goal. In attempting to improve formulation of the governing metrics, the method 300 may be continued to determine whether other governing metrics are more effective in reaching and/or maintaining the high-level goal as discussed in the following steps.

In response to a determination that the method 300 is to continue, another low-level governing policy to achieve the high-level goal is formulated, as indicated at step 314. The another low-level governing policy differs from the low-level governing policy formulated at step 204. However, the another low-level governing policy may be selected in manners similar to those described above with respect to step 204.

The another low-level governing policy may be selected from a list of potential low-level governing policies stored in the library 132. The another low-level governing policy may be randomly selected from the list or it may be selected based upon a previously determined correlation between the another low-level governing policy and the high-level goal identified at step 202. For instance, low-level governing policies that have previously been determined to be relatively ineffective in reaching and/or maintaining the high-level goal may not be selected at step 314.

In any regard, at step 316, additional properties of the provisioned system relating to the another low-level governing policy selected at step 314 are identified. The additional properties may be identified in manners as discussed above with respect to step 206. In addition, at step 318, the identified additional properties are formulated into additional governing metrics relevant to the selected another low-level governing policy in various manners as described above with respect to step 208. Moreover, at step 320, the additional governing metrics are outputted in various manners as described above with respect to step 210.

In outputting the additional governing metrics, the additional governing metrics may be stored in the data store 130, and may be used in correlating the additional governing metrics and its effectiveness in reaching and/or maintaining the high-level goal identified as step 202.

In addition, the additional governing metrics may be outputted to the resource controller 150 and the resource controller 150 may manipulate one or more of the actuators 152 based upon the additional governing metrics, as indicated at step 302. In addition, steps 304-308 may be performed based upon the additional governing metrics to store and/or update the rankings of the low-level governing policies according to their respective effectiveness levels in reaching and/or maintaining the high-level goal identified at step 202. Steps 302-320 may be repeated until a determination to end the method 300 is made at step 310.

Figure 3B:
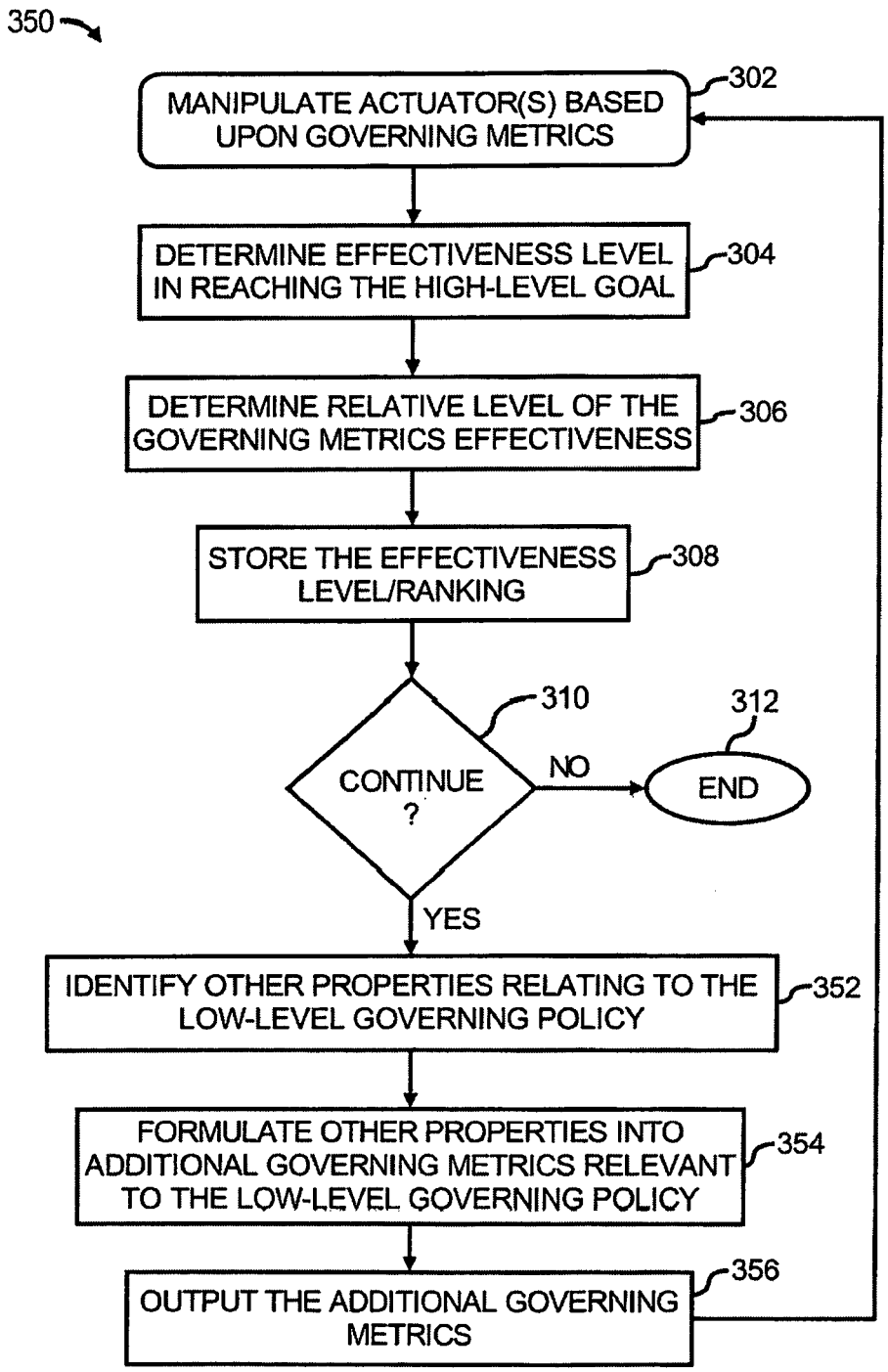
FIG. 3B illustrates a flow diagram of a method of ranking the effectiveness levels of governing metrics with respect to reaching and/or maintaining a desired high-level goal for a particular low-level governing policy, according to an embodiment of the invention.

As an alternative, in place of or in combination with steps 314-320, steps 352-356 depicted in FIG. 3B, along with steps 302-312, may be implemented in ranking the effectiveness levels of the governing metrics with respect to reaching and/or maintaining a desired high-level goal for a particular low-level governing policy, according to an example. More particularly, the method 350 may be implemented to enable evaluation of the effectiveness level different properties have in reaching and/or maintaining a desired high-level goal.

As shown in FIG. 3B, following a decision to continue the method 350 at step 310, one or more properties other than those identified at step 206 in FIG. 2, are identified at step 352. Thus, for instance, if temperature was identified at step 206, one or more of pressure, humidity, mass flow rate, etc., may be identified at step 352.

At step 354, the identified other properties are formulated into additional governing metrics relevant to the low-level governing policy selected at step 204 in FIG. 2. Moreover, the additional governing metrics are outputted at step 320 in various manners as described with respect to step 210 in FIG. 2. In outputting the additional governing metrics, the additional governing metrics may be stored in the data store 130, and may be used in correlating the additional governing metrics and its effectiveness in reaching and/or maintaining the high-level goal identified as step 202.

In addition, the additional governing metrics may be outputted to the resource controller 150 and the resource controller 150 may manipulate one or more of the actuators 152 based upon the additional governing metrics, as indicated at step 302. In addition, steps 304-308 may be performed based upon the additional governing metrics to store and/or update the rankings of the low-level governing policies according to their respective effectiveness levels in reaching and/or maintaining the high-level goal identified at step 202. Steps 302-312 and 352-356 may be repeated until a determination to end the method 350 is made at step 310.

Figure 3C:
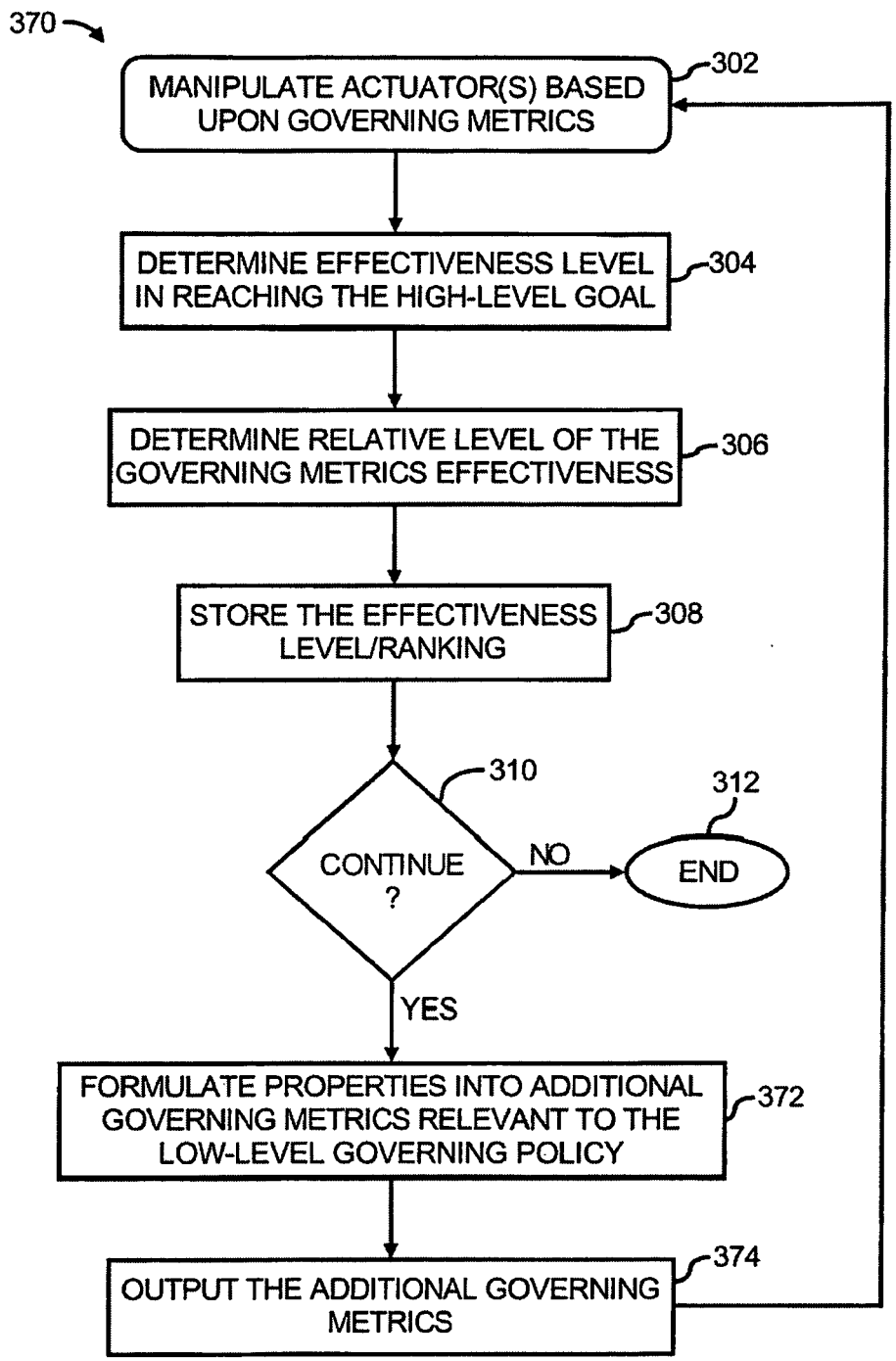
FIG. 3C illustrates a flow diagram of a method of ranking the effectiveness levels of governing metrics with respect to reaching and/or maintaining a desired high-level goal for a particular set of properties in a low-level governing policy, according to an embodiment of the invention.

As another alternative, in place of or in combination with steps 314-320 and/or steps 352-356, steps 372 and 374 depicted in FIG. 3C, along with steps 302-312, may be implemented in ranking the effectiveness levels of the governing metrics with respect to reaching and/or maintaining a desired high-level goal for a particular set of properties in a low-level governing policy, according to an example. More particularly, the method 370 may be implemented to enable evaluation of the effectiveness level different properties have in reaching and/or maintaining a desired high-level goal.

As shown in FIG. 3C, following a decision to continue the method 370 at step 310, the properties identified at any of steps 206, 316, and 354 are formulated into additional governing metrics relevant to a low-level governing policy. By way of example, the additional governing metrics may be formulated by applying a different weighting factor for one of the properties as compared with another one of the properties. In addition, the weighting factors may be applied differently to the properties during additional iterations of the method 370 in identifying other properties at step 352.

In any regard, the additional governing metrics are outputted at step 356 in various manners as described with respect to step 210 in FIG. 2. In outputting the additional governing metrics, the additional governing metrics may be stored in the data store 130, and may be used in correlating the additional governing metrics and its effectiveness in reaching and/or maintaining the high-level goal identified as step 202.

In addition, the additional governing metrics may be outputted to the resource controller 150 and the resource controller 150 may manipulate one or more of the actuators 152 based upon the additional governing metrics, as indicated at step 302. In addition, steps 304-308 may be performed based upon the additional governing metrics to store and/or update the rankings of the low-level governing policies according to their respective effectiveness levels in reaching and/or maintaining the high-level goal identified at step 202. Steps 302-312, 372, and 374 may be repeated until a determination to end the method 370 is made at step 310.

The various steps outlined in the methods 300, 350, and 370 may be performed either in place of or in addition to various other steps outlined in the methods 300, 350, and 370 without departing from a scope of the invention. For instance, steps 314-320 may be performed in combination with either or both of steps 352-356 and steps 372 and 374.

In addition, one or more of the methods 200, 300, 350, and 370 may be performed at different times for the same provisioned system. By way of example, the provisioned system may be configured to reach a different high-level goal during different times in a day or during different days in a week as may occur with changing periods of peak demand. In this example, formulation of the governing metrics may adapt to the temporally changing high-level goals. The implementation of the formulated governing metrics may also adapt to the changing high-level goals.

In addition, or alternatively, one or more of the methods 200, 300, 350, and 370 may be performed independently at different locations within the provisioned system. By way of example, one zone of the provisioned system may be configured to reach a different high-level goal as compared with another zone of the provisioned system. In this example, the formulation of the governing metrics may differ depending upon the zone in which the governing metrics are to be applied. The implementation of the formulated governing metrics may therefore be adapted according to the high-level goals identified for the different zones.

Figure 4:
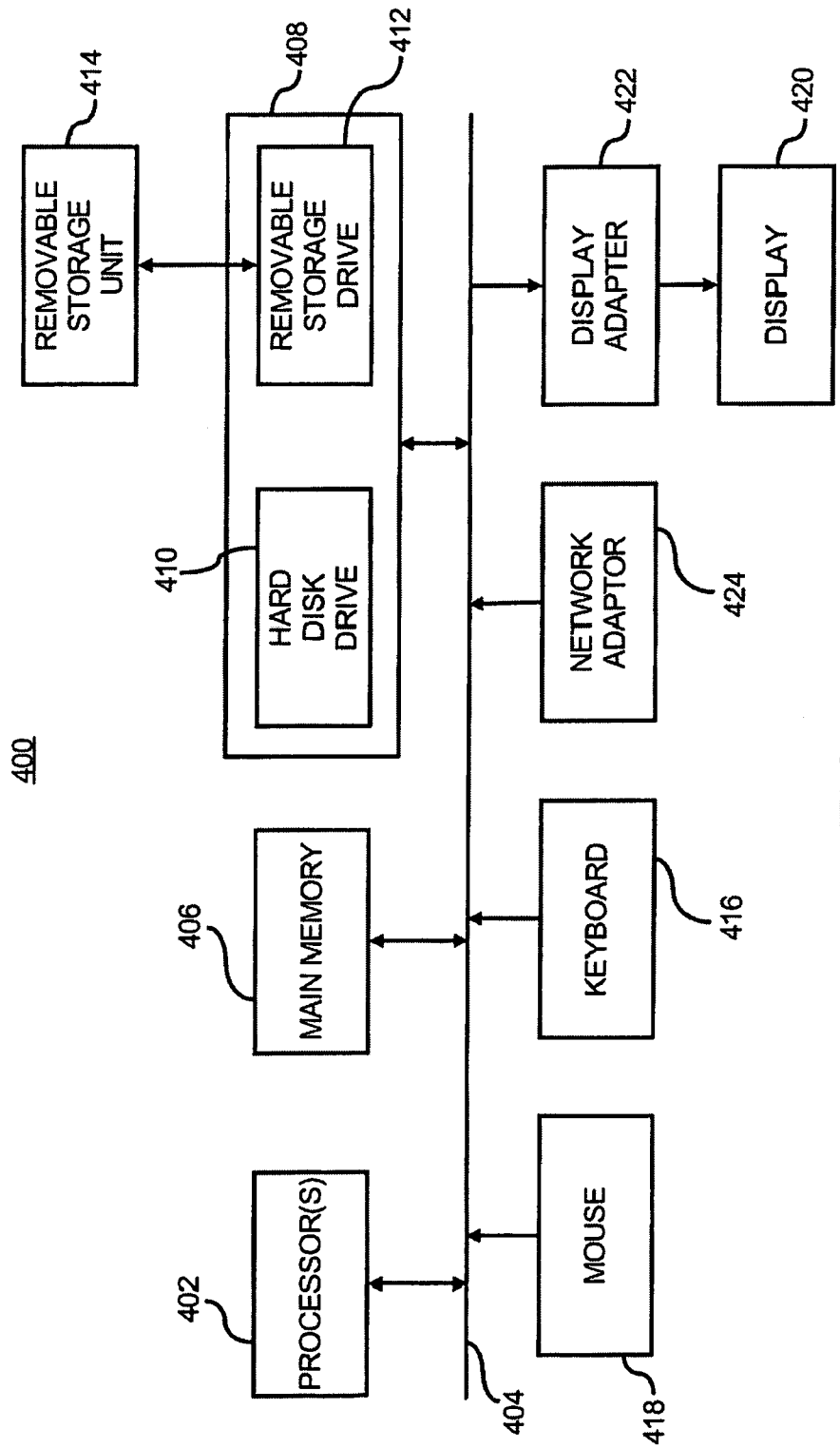
FIG. 4 shows a block diagram of a computing apparatus configured to implement or execute the governing metric generator depicted in FIG. 1, according to an embodiment of the invention.

Turning now to FIG. 4, there is shown a block diagram of a computing apparatus 400 configured to implement or execute the governing metric generator 102 depicted in FIG. 1, according to an example. In this respect, the computing apparatus 400 may be used as a platform for executing one or more of the functions described hereinabove with respect to the governing metric generator 102.

The computing apparatus 400 includes a processor 402 that may implement or execute some or all of the steps described in the methods 200, 300, 350, and 370. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the methods 200, 300, 350, and 370 may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of generating governing metrics, said method comprising:
   identifying a high-level goal to be met in a provisioned system, wherein the high-level goal comprises a goal identified in a service level agreement between an operator of the provisioned system and a client;
   selecting a low-level governing policy designed to facilitate achievement of the high-level goal, wherein the low-level governing policy comprises a policy to achieve local control of a resource of the provisioned system;
   identifying properties relating to the selected low-level governing policy;
   formulating governing metrics relevant to the selected low-level governing policy using the identified properties;
   determining, by a processor, a level of effectiveness of the formulated governing metrics in reaching the high-level goal; and
   ranking the effectiveness level of the formulated governing metrics against effectiveness levels of other governing metrics in reaching the high-level goal.

2. The method according to claim 1, comprising outputting the formulated governing metrics to at least one of a display, a storage device, and a computing device.

3. The method according to claim 1, comprising: supplying the formulated governing metrics to a resource controller to manipulate one or more actuators based upon the formulated governing metrics.

4. The method according to claim 3, wherein determining the level of effectiveness of the formulated governing metrics in reaching the high-level goal comprises determining the level of effectiveness of the formulated governing metrics responsive to the manipulation of the one or more actuators based upon the formulated governing metrics;
   storing the ranking of the effectiveness level of the formulated governing metrics in a library.

5. The method according to claim 4, comprising:
   selecting another low-level governing policy designed to facilitate achievement of the high level goal;
   identifying additional properties relating to the selected another low-level governing policy;
   formulating additional governing metrics relevant to the selected another low-level governing policy using the identified additional properties;
   determining a level of effectiveness of the additional formulated governing metrics in reaching the high-level goal;
   ranking the effectiveness level of the additional formulated governing metrics with respect to the effectiveness level of the other governing metrics; and
   storing the ranking of the effectiveness level of the additional formulated governing metrics in the library.

6. The method according to claim 4, comprising:
   identifying at least one other property relating to the identified low-level governing policy;
   formulating additional governing metrics relevant to the selected another low-level governing policy using the at least one other property;
   determining a level of effectiveness of the formulated additional governing metrics in reaching the high-level goal;
   ranking the effectiveness level of the formulated additional governing metrics with respect to the other governing metrics; and
   storing the ranking of the effectiveness level of the additional formulated governing metrics in the library.

7. The method according to claim 4, comprising:
   formulating additional governing metrics relevant to the selected low-level governing policy using the identified properties;
   determining a level of effectiveness of the formulated additional governing metrics in reaching the high-level goal;
   ranking the effectiveness level of the additional formulated governing metrics with respect to the effectiveness level of the other governing metrics; and
   storing the ranking of the effectiveness level of the additional formulated governing metrics in the library.

8. The method according to claim 1, wherein selecting the low-level governing policy comprises accessing a library that comprises a correlation between the high level goals and low-level governing policies designed to facilitate achievement of the high level goals, wherein the low-level governing policies are ranked according to their respective effectiveness levels with respect to achieving the high-level goals.

9. The method according to claim 8, comprising:
   updating the rankings of the low-level governing policies based upon effectiveness levels of the formulated governing metrics as determined through implementation of the formulated governing metrics to achieve the high level goals.

10. The method according to claim 1, comprising:
    identifying another high-level goal to be met in the provisioned system;
    selecting another low-level governing policy designed to facilitate achievement of the another high-level goal;
    identifying properties relating to the another low-level governing policy;
    formulating another set of governing metrics relevant to the another low-level governing policy using the identified properties; and
    outputting the another set of formulated governing metrics.

11. The method according to claim 1, wherein the identified properties include thermodynamic properties and formulating governing metrics relevant to the selected low-level governing policy includes using the identified thermodynamic properties.

12. The method according to claim 1, wherein formulating the governing metrics comprises weighting at least one of the identified properties more heavily than at least one other identified property in formulating the governing metrics.

13. A computer-implemented governing metric generator, said computer-implemented governing metric generator comprising:
- an input module to receive data regarding a desired high-level goal to be met in a provisioned system, wherein the high-level goal comprises a goal identified in a service level agreement between an operator of the provisioned system and a client;
- a low-level governing policy module to select a low-level governing policy designed to facilitate achievement of the desired high-level goal, wherein the low-level governing policy comprises a policy to achieve local control of a resource of the provisioned system;
- a property identifying module to identify properties relating to the selected low-level governing policy;
- a governing metric formulating module to formulate governing metrics relevant to the selected low-level governing policy using the identified properties;
- a monitoring module to at least one of track and evaluate the formulated governing metrics to determine effectiveness levels of the formulated governing metrics with respect to the high-level goal; and
- a processor to implement the input module, the low-level governing policy module, the property identifying module, the governing metric formulating module, and the monitoring module.

14. The computer-implemented governing metric generator according to claim 13, wherein the low-level governing policy module is to select another low-level governing policy designed to facilitate achievement of another desired high-level goal, and wherein the governing metric formulating module is to define additional governing metrics relevant to the selected another low-level governing policy.

15. The computer-implemented governing metric generator according to claim 13, wherein the low-level governing policy module is to access a library that comprises a correlation between the high level goal and low-level governing policies designed to facilitate achievement of the high level goal, and wherein the low-level governing policies are ranked according to their respective effectiveness levels with respect to achieving the high-level goal.

16. The computer-implemented governing metric generator according to claim 13, wherein the identified properties include thermodynamic properties, and to formulate governing metrics relevant to the selected low-level governing policy includes using the identified thermodynamic properties.

17. The computer-implemented governing metric generator according to claim 13, comprising:
- a sensor input module to receive sensed data pertaining to the identify properties, and wherein the monitoring module is to evaluate the sensed data in determining the effectiveness levels of the formulated governing metrics with respect to one or more high-level goals.

18. The computer-implemented governing metric generator according to claim 13, wherein the monitoring module ranks the effectiveness level of the formulated governing metrics with respect to effectiveness levels of at least one other governing metrics.

19. A non-transitory computer readable storage medium on which is embedded one or more computer programs, said one or more computer programs implementing a method of generating governing metrics, said one or more computer programs comprising a set of instructions to:
- identify a high-level goal to be met in a provisioned system, wherein the high-level goal comprises a goal identified in a service level agreement between an operator of the provisioned system and a client;
- select a low-level governing policy designed to facilitate achievement of the high-level goal, wherein the low-level governing policy comprises a policy to achieve local control of a resource of the provisioned system;
- identify properties relating to the selected low-level governing policy;
- formulate governing metrics relevant to the selected low-level governing policy using the identified properties;
- determine a level of effectiveness of the formulated governing metrics in reaching the high-level goal; and
- rank the effectiveness level of the formulated governing metrics.

20. The non-transitory computer readable storage medium according to claim 19, said set of instructions further to:
- supply the formulated governing metrics to a resource controller to control resource provisioning in the provisioned system, wherein the resource controller is to manipulate one or more actuators based upon the governing metrics;
- wherein the level of effectiveness of the formulated governing metrics is determined based upon results of the manipulation of the one or more actuators based upon the formulated governing metrics; and
- store the ranking of the effectiveness level of the formulated governing metrics in a library.

* * * * *